(12) United States Patent
Carlson

(10) Patent No.: US 10,996,690 B2
(45) Date of Patent: May 4, 2021

(54) PRODUCT RESERVOIR VALIDATION SYSTEM

(71) Applicant: GOJO Industries, Inc., Akron, OH (US)

(72) Inventor: Grant Benjamin Carlson, Hammonds Port, NY (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 16/655,297

(22) Filed: Oct. 17, 2019

(65) Prior Publication Data

US 2020/0097030 A1     Mar. 26, 2020

Related U.S. Application Data

(63) Continuation of application No. 15/351,982, filed on Nov. 15, 2016, now Pat. No. 10,459,460.

(60) Provisional application No. 62/255,690, filed on Nov. 16, 2015.

(51) Int. Cl.
   *G05D 7/06* (2006.01)
   *A47K 5/12* (2006.01)
   *G05B 15/02* (2006.01)

(52) U.S. Cl.
   CPC ......... *G05D 7/0676* (2013.01); *A47K 5/1217* (2013.01); *G05B 15/02* (2013.01)

(58) Field of Classification Search
   None
   See application file for complete search history.

(56) References Cited

U.S. PATENT DOCUMENTS

| | | | |
|---|---|---|---|
| 4,247,028 A | 1/1981 | Credle | |
| 4,335,835 A | 6/1982 | Beigler et al. | |
| 4,493,435 A * | 1/1985 | Hartley | B67D 1/12 137/113 |
| 4,782,451 A | 11/1988 | Mazzarella et al. | |
| 4,803,086 A | 2/1989 | Hedenberg | |
| 4,895,276 A * | 1/1990 | Maldonado | A47K 5/1215 222/144.5 |
| 4,993,595 A | 2/1991 | Bertram et al. | |
| 5,042,691 A | 8/1991 | Maldonado | |
| 5,161,702 A | 11/1992 | Skalski | |
| 5,242,081 A | 9/1993 | van der Heyden et al. | |

(Continued)

FOREIGN PATENT DOCUMENTS

EP    1605392 A1    12/2005
GB    1118419 A     7/1968

(Continued)

OTHER PUBLICATIONS

European Search Report dated Jan. 13, 2014 for European Patent Application No. EP 13 18 3871.

(Continued)

*Primary Examiner* — Robert K Carpenter
(74) *Attorney, Agent, or Firm* — Calfee, Halter & Griswold LLP

(57) ABSTRACT

A system and method of authenticating a replaceable product reservoir for use in a product dispenser includes incorporating a data storage device into the replaceable product reservoir where the dispenser control reads data from the storage device to verify that the correct replaceable product reservoir has been installed in the product dispenser.

17 Claims, 9 Drawing Sheets

(56) References Cited

U.S. PATENT DOCUMENTS

| | | |
|---|---|---|
| 5,365,312 A | 11/1994 | Hillman et al. |
| 5,494,193 A | 2/1996 | Kirschner et al. |
| 5,609,091 A | 12/1997 | Bullock et al. |
| 5,706,977 A | 1/1998 | Ogura et al. |
| 5,842,603 A | 12/1998 | Schroeder et al. |
| 5,944,227 A | 8/1999 | Schroeder et al. |
| 6,036,055 A | 3/2000 | Mogadam et al. |
| 6,039,430 A | 3/2000 | Helterline et al. |
| 6,062,427 A | 5/2000 | Du |
| 6,312,106 B1 | 11/2001 | Walker |
| 6,318,600 B1 | 11/2001 | Winnett |
| 6,325,244 B2 | 12/2001 | Vincent et al. |
| 6,390,329 B1 | 5/2002 | Maddox |
| 6,431,400 B1 | 8/2002 | O'Maley et al. |
| 6,467,888 B2 | 10/2002 | Wheeler et al. |
| 6,557,729 B2 | 5/2003 | Gauthier |
| 6,564,999 B1 | 5/2003 | Saveliev et al. |
| 6,877,642 B1 | 4/2005 | Maddox et al. |
| 6,879,876 B2 | 4/2005 | O'Dougherty et al. |
| 6,883,563 B2 | 4/2005 | Smith |
| 6,907,741 B2 | 6/2005 | Kateman |
| 6,929,155 B2 | 8/2005 | Sayers |
| 6,990,391 B1 | 1/2006 | Cunha et al. |
| 7,009,519 B2 | 3/2006 | Leonard et al. |
| 7,028,861 B2 | 4/2006 | Sayers et al. |
| 7,097,074 B2 | 8/2006 | Halliday et al. |
| 7,156,353 B2 | 1/2007 | Kringel |
| 7,196,624 B2 | 3/2007 | Teller |
| 7,202,780 B2 | 4/2007 | Teller |
| 7,265,673 B2 | 9/2007 | Teller |
| 7,520,407 B2 | 4/2009 | Crosby |
| 7,621,426 B2 | 11/2009 | Reynolds et al. |
| 7,783,380 B2 | 8/2010 | York |
| 7,837,066 B2 | 11/2010 | Reynolds et al. |
| 8,009,015 B2 | 8/2011 | Sayers et al. |
| 8,181,822 B2 | 5/2012 | Doelman et al. |
| 8,240,508 B2 | 8/2012 | Wegelin |
| 8,463,447 B2 | 6/2013 | Newman et al. |
| 8,833,067 B2 | 9/2014 | Opdenbosch |
| 8,833,607 B2 | 9/2014 | Wegelin |
| 9,357,887 B2 | 6/2016 | Wegelin et al. |
| 9,555,429 B2 | 1/2017 | Wegelin |
| 2002/0170731 A1 | 11/2002 | Garber et al. |
| 2003/0006281 A1 | 1/2003 | Thomas et al. |
| 2005/0127090 A1 | 6/2005 | Sayers et al. |
| 2005/0145745 A1 | 7/2005 | Lewis et al. |
| 2005/0171634 A1 | 8/2005 | York et al. |
| 2005/0177274 A1 | 8/2005 | O'Dougherty et al. |
| 2006/0173576 A1 | 8/2006 | Goerg et al. |
| 2006/0180647 A1 | 8/2006 | Hanson |
| 2008/0185395 A1 | 8/2008 | Sahud |
| 2010/0025427 A1 | 2/2010 | Chiou |
| 2013/0098941 A1* | 4/2013 | Wegelin ............... B05B 12/004 222/23 |
| 2015/0251840 A1 | 9/2015 | Kuehn |
| 2017/0011221 A1* | 1/2017 | Green ................... G06F 21/602 |

FOREIGN PATENT DOCUMENTS

| | | |
|---|---|---|
| GB | 2416757 A | 2/2006 |
| JP | 13691/85 | 1/1985 |
| JP | 4574/86 | 1/1986 |
| WO | 03005295 A1 | 1/2003 |
| WO | 2007070032 A1 | 6/2007 |
| WO | 2009032874 A2 | 3/2009 |

OTHER PUBLICATIONS

European Search Report dated Jan. 14, 2014 for European Patent Application No. EP 13 18 3872.

European Search Report dated Jan. 14, 2014 for European Patent Application No. EP 13 18 3873.

\* cited by examiner

PRODUCT RESERVOIR VALIDATION SYSTEM

RELATED APPLICATIONS

The present application is a continuation of, and claims priority to and the benefits of U.S. Non-Provisional application Ser. No. 15/351,982, which was filed on Nov. 15, 2016 and which will issue as U.S. Pat. No. 10,459,460 on Oct. 29, 2019, and which is incorporated herein by reference in its entirety. This application also claims priority to, and the benefits of, U.S. Provisional Patent Application Ser. No. 62/255,690 filed on Nov. 16, 2015 and titled Product Reservoir Validation System, which is incorporated herein by reference in its entirety.

FIELD OF THE INVENTION

The present invention relates generally to systems and methods for authenticating a replaceable product reservoir for use with a product dispenser, and in particular to systems and methods for reading and writing data to memory devices incorporated into the replaceable product reservoir.

BACKGROUND OF THE INVENTION

It is well known to provide dispensers in public areas such as hospitals, bathrooms, healthcare facilities and factories. Dispensers distribute products such as soap, hand sanitizers, and lotions. Some dispensers are designed with a manually actuated pump where the user pushes or pulls a lever to dispense a quantity of product into the user's hands. "Hands-free" dispensers are also known. For these types of dispensers, the user places their hand underneath the dispenser where a sensor is located. The sensor signals an onboard controller that the user's hands are properly positioned and subsequently initiates a dispense event.

With the discovery of germ-laden biofilms, many companies in an effort to dispense sanitary products manufacture dispensers that use replaceable product reservoirs, also known as refill containers or refill units. The product reservoirs are filled and sealed in a sanitary environment. In many cases, the reservoir comes with a disposable pump and nozzle. In this way when the dispenser is replenished, every part wetted by product is replaced thereby eliminating or greatly reducing the generation of biofilms.

Manufacturers of dispensers and dispensable products often enlist distributors to install and service their dispensers. The manufacturers rely on distributors to place the correct refill container in the dispenser housing. It would be problematic, for example, if hospital personnel receive dispensed moisturizing lotion when the user needs and is expecting hand sanitizer. In the past, manufacturers have provided "keyed" systems for each type of fluid refill container. The keyed components match a corresponding structure on the fluid dispenser. This ensures compatibility of the product with the dispenser.

Additionally, manufacturers and distributors prefer dispensers with keyed systems to prevent individuals from installing an unauthorized product, commonly referred to as "stuffing." Stuffing prevents the manufacturer and the distributor from ensuring that their dispensers are dispensing their products. Also, stuffing results in user's not receiving the product that they believe they are receiving.

Prior art systems, however, have been ineffective against users intent on bypassing keyed systems. Mechanical keys and some electrical types of keys can be bypassed and the refill containers reused. This is especially detrimental for products that may develop bio-films when exposed to the atmosphere or become contaminated. In other situations, keyed systems that read tags or other indicia applied to the refill container can be circumvented by applying a counterfeit tag to an unauthorized refill container.

What is needed is an anti-stuffing system that can't be bypassed or counterfeited. The embodiments of the invention described below obviate the aforementioned problems.

DETAILED DESCRIPTION

Exemplary embodiments of the present invention relate to authenticating systems for authenticating refill units. It will be appreciated that different manifestations of product dispensers are to be construed as falling within the scope of protection sought by the claimed subject matter, examples of which include wall-mounted dispensers, counter-mounted dispensers and hand-held dispensers.

Figure 1:
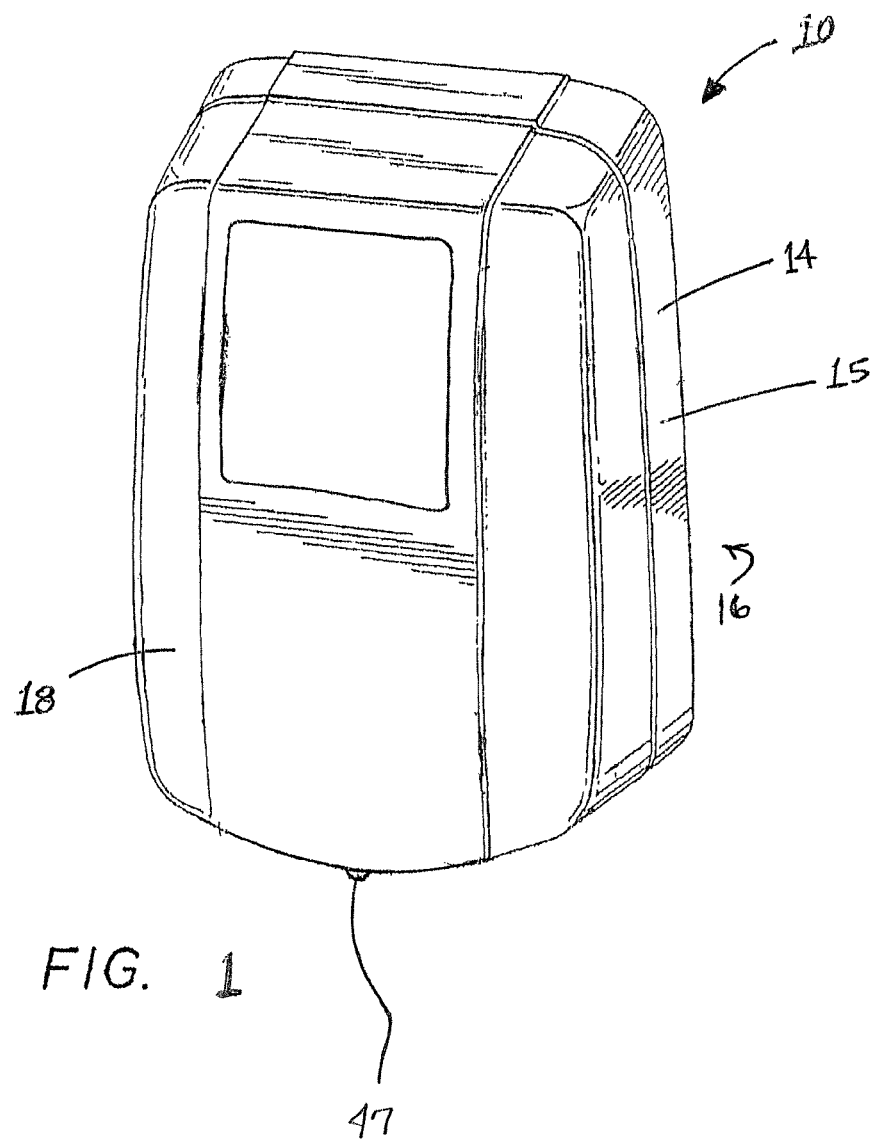
FIG. 1 depicts a product dispenser according to the embodiments of the subject invention.

An exemplary product dispenser 10 is depicted in FIG. 1. Dispenser 10 dispenses a measured amount of product according to the embodiments of the subject invention. The product dispenser 10 dispenses hand care products, such as, for example, soap, lotion or sanitizers, however, other products, granular or liquid, may similarly be dispensed from the product dispenser 10.

Figure 2:
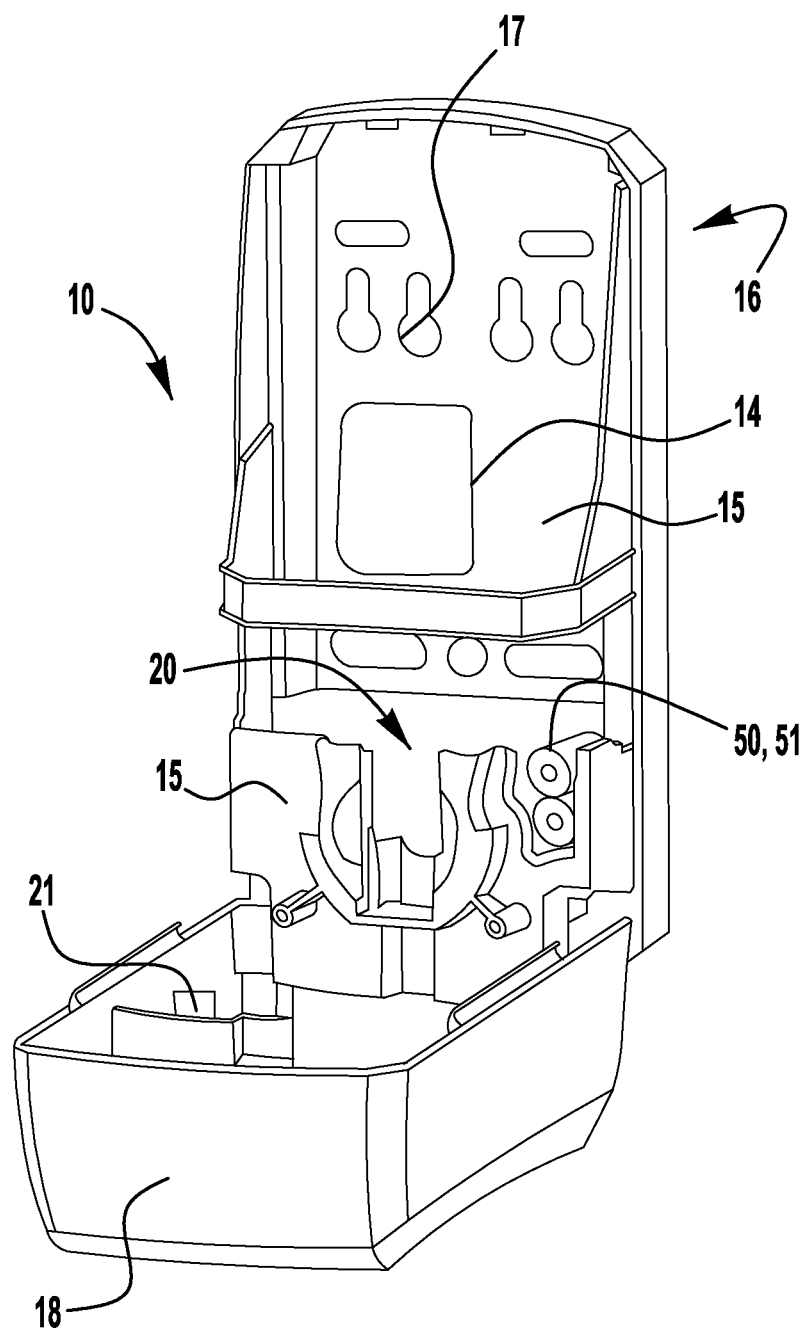
FIG. 2 depicts an opened product dispenser showing the dispenser's interior according to the embodiments of the subject invention.
Figure 3:
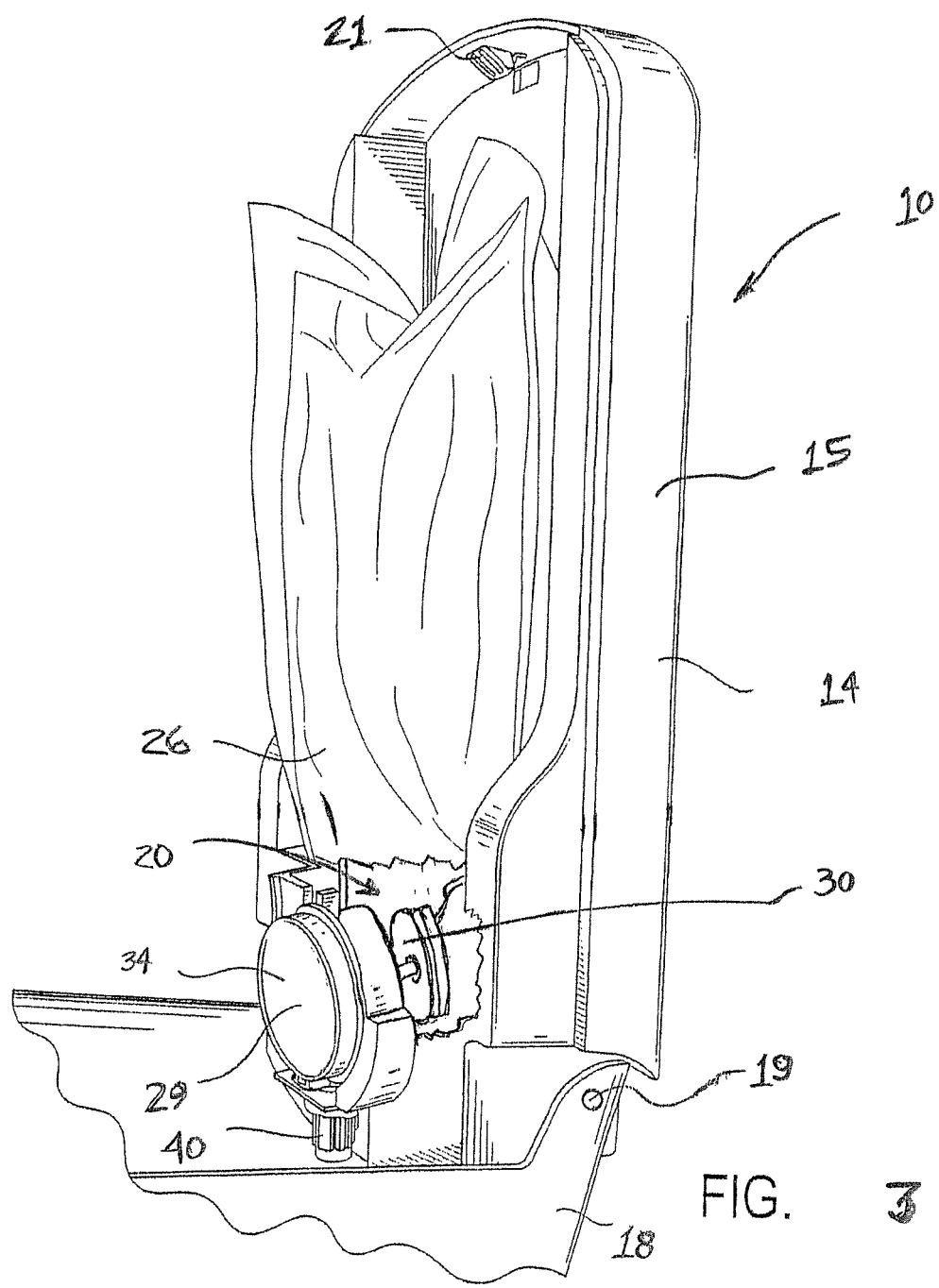
FIG. 3 depicts a product reservoir installed in a product dispenser, according to the embodiments of the subject invention.

As illustrated in FIGS. 1 through 3, the product dispenser 10 includes a dispenser housing 14 also interchangeably referred to as a base 14. The housing 14 or base 14 is made of one or more walls 15 constructed to support the components of the product dispenser 10. Plastic may be used for cost-effective manufacturing of the base 14, as well as other components of the system. A product reservoir 26, which may be readily replaceable, is received by the base 14 and may incorporate a pump 29 for dispensing product in a manner known in the art. At a rear side 16 of the base 14, a mounting bracket or mounting holes 17 (shown in FIG. 2) are included for attaching the dispenser 10 to a wall, a table, a dispenser stand or other supporting structure, not shown in the figures.

The product dispenser 10 includes a dispenser cover 18 that is connected to the base 14. The cover 18 is pivotally connected to the base 14 via hinge 19 and secured in place by way of a latch 21. In some embodiments, the base 14 and cover 18 close together to form an enclosure that limits immediate access to the product dispenser 10. The latch 21 may include a lock and key to prevent access by unauthorized personnel.

The base 14 is designed to securely receive the product reservoir 26. The walls 15 of the base 14 may be constructed to form a concave region 20 at one end of the product dispenser 10 and function to hold the reservoir 26 in place during use. In some embodiments, the replaceable reservoir 26, pump 29 and nozzle 40 are a single unit and are collectively referred to herein as a refill unit 27. In some embodiments, reservoir 26 is removable and replaceable without removing and replacing pump 29 and nozzle 40. Once installed, a manually activated push bar (not shown) may actuate the pump 29 by direct contact or contact through a series of linkages, also not shown in the figures. Alternatively, the pump 29 may be activated by a pump actuator 30 (shown in FIG. 3) via couplings or linkages which engage the pump 29 and thereby dispense product. Actuation in this embodiment may be initiated by a sensor 47 configured to detect the presence of a user's hand in proximity to the nozzle 40 (reference FIG. 1). Alternative embodiments are contemplated where actuation of a dispensing event may be initiated by depressing an electronic switch, or other activation known means. Those skilled in the art will appreciate that a dispenser control may be required to actuate the pump 29.

The pump 29 may be a fluid piston pump 34. In some embodiments, the pump 29, 34 is secured to the reservoir 26 and may be removed with the reservoir 26 when replaced with another refill unit 27, as described above. In another embodiment, the pump 29, 34 may be attached to the base 14 of the product dispenser 10. In these exemplary embodiments, when the reservoir 26 is replaced, the outlet of the product reservoir 26 is fluidly connected to the inlet 28 of the pump 29, 34 (reference FIG. 6). Other types of pumps may be used with the product dispenser 10, including but not limited to: peristaltic pumps, positive displacement pumps, dome pumps, diaphragm pumps, and the like.

The pump actuator 30 may include an electrically powered motor 31, such as, for example, an electrically-powered DC motor 31. Skilled artisans will understand that the DC motor 31 may be driven by a full duty-cycle DC signal, a PWM (pulse width modulated) signal or other electrical signal configuration as chosen with sound judgment. Other types of motors/actuators may be incorporated for use with the product dispenser 10, including but not limited to: AC motors or pneumatic actuators.

The product dispenser 10 may further include a power source 50. The power source 50 may include, either individually or in combination of, any of the following: mains power, solar or photoelectric power, one or more disposable or rechargeable batteries, power harvested from temperature differential or electro-magnetic waves, and the like. The exemplary embodiments described and illustrated herein discuss electrochemical cell batteries 51 (reference FIG. 2), which are exemplary in nature and should not be construed as limiting. In one particular embodiment, the product dispenser 10 includes an onboard power source 50, i.e. batteries 51, which are received by the base 14 or cover 18. The batteries 51 may be removed when depleted of energy and replaced with new batteries. In some exemplary embodiments, the batteries 51 need not be directly mounted to or received by the product dispenser 10, but may be carried on the refill unit 27 and received or connected to the dispenser 10. In this exemplary embodiment, when the reservoir 26 or refill unit 27 is replaced, the product dispenser 10 is automatically resupplied with fresh batteries 51. Energy from the power source 50 is used to provide operating power to the product dispenser 10, e.g. to operate the motor 30, to provide power to the dispenser control 60 or to enable operation of sensors 47. In some embodiments, multiple power sources are provided, such as, for example, one on the dispenser 10 and one on the refill unit 27.

Figure 4:
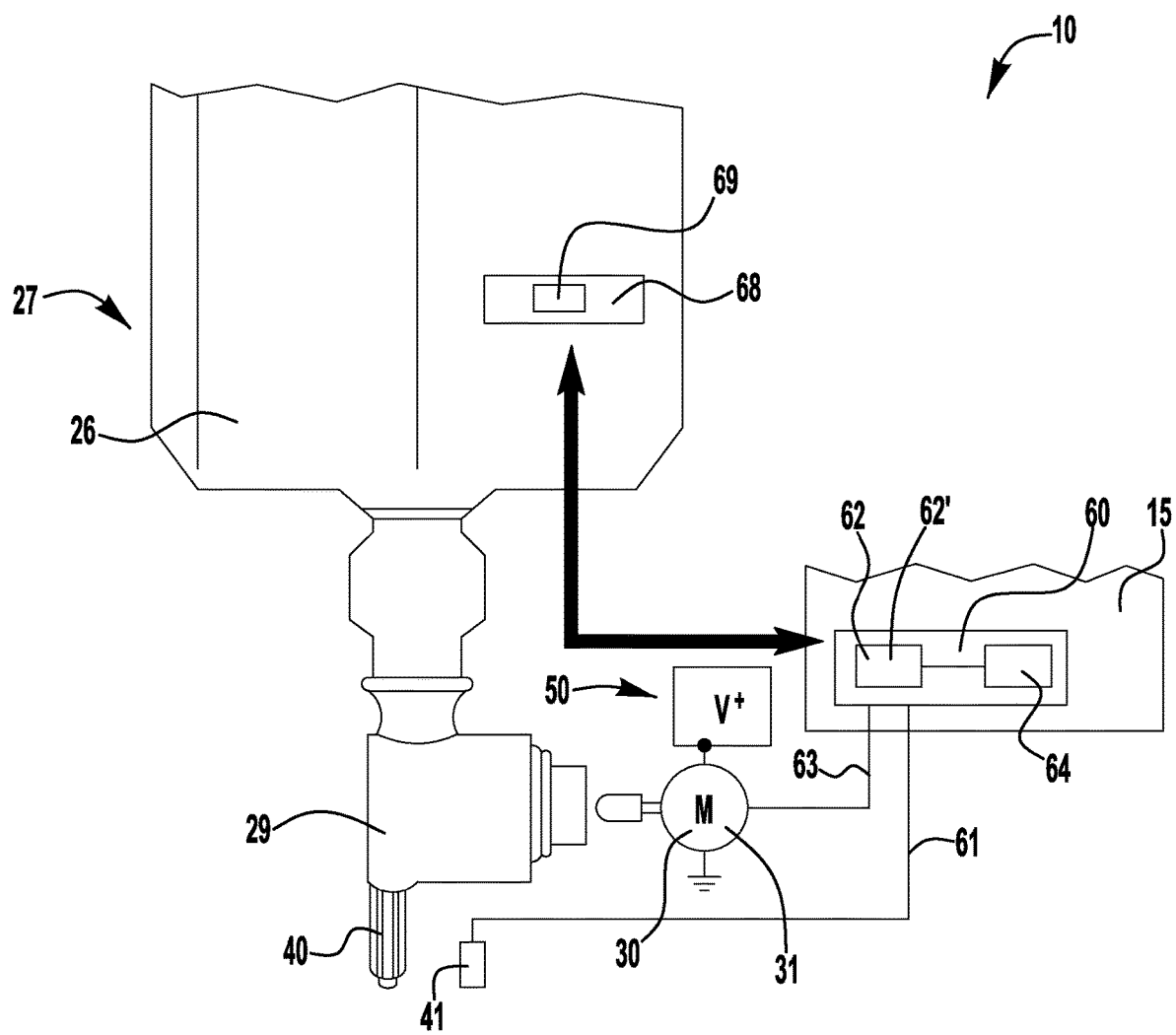
FIG. 4 depicts a schematic representation of a data storage device incorporated into a product reservoir, and a dispenser controller in operative communication with the data storage device, according to the embodiments of the subject invention.
Figure 5:
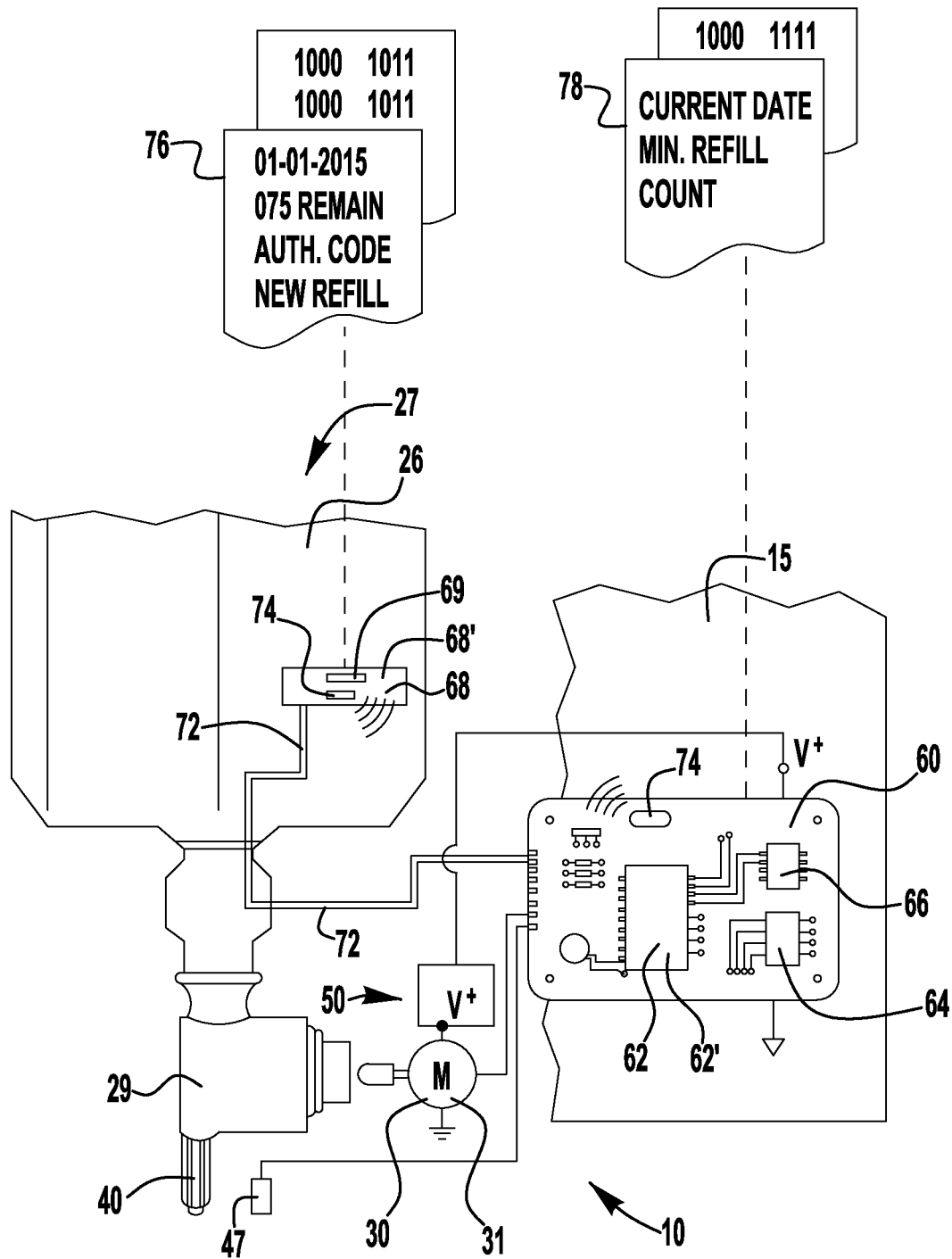
FIG. 5 depicts a schematic representation of status data stored in a data storage device and threshold data stored in the dispenser control, according to the embodiments of the subject invention.

With reference now to FIGS. 4 and 5, a dispenser control (also referred to as a controller) is shown schematically as represented by reference number 60. In general, the dispenser control 60 manages operations of the product dispenser 10. In some embodiments, dispenser control 60 uses a logic processor 62 (reference FIG. 5) to operate the product dispenser 10. The logic processor 62 includes one or more inputs 61 and/or outputs 63 that in circuit communications with other components of the product dispenser 10.

"Circuit communication" indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

"Logic," as used herein, is synonymous with "circuit" or "circuitry" and includes, but is not limited to, hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions.

"Signal," includes, but is not limited to one or more electrical signals, analog or digital signals, one or more computer instructions, a bit or bit stream, or the like.

Any values identified in the detailed description are exemplary and they are determined as needed for a particular dispenser and/or refill design. Accordingly, the inventive concepts disclosed and claimed herein are not limited to the particular values or ranges of values used to describe the embodiments disclosed herein.

In one particular embodiment, the dispenser control 60 includes an output 63 that is electrically communicated to the motor 31. Output 63 may comprise one or more electrical signals that direct and regulate the flow of power from the batteries 51 to the motor 31. Electrical contacts, relays, transistors or other types of electrical switching devices may be used to selectively deliver power to the motor 31. The dispenser control 60 sends out an electrical signal that may be amplified and/or modulated to control the motor 31. The motor 31 in-turn engages the pump 29 to dispense product from the nozzle 40.

As mentioned above, a sensor 47 may be used to detect a user's hands in proximity to the nozzle 40. The sensor 47 is in circuit communication with dispenser control 60. The sensor signals may comprise analog or digital signals, which are communicated to an input 61 of the dispenser control 60. When a user approaches the product dispenser 10, the sensor 47 triggers or initiates activation of a dispense event by sending a signal to the dispenser control 60, after which the dispenser control 60 processes the signal and selectively sends an output 63 to actuate the motor 31.

With continued reference to FIG. 4 and now also to FIG. 5, the logic processor 62 of the dispenser control 60 may be any type of processor, such as, for example, a microprocessor 62' or a microcontroller 62'. Depending on the type of logic processor 62 used, the dispenser control 60 may include peripheral circuitry 66 to facilitate operation of the logic processor 62. Peripheral circuitry 66 may include: power regulators, analog-to-digital converters, shift registers and the like. Other types of electronic circuitry may also be included for use with the logic processor 62 and may include memory 64, either volatile or nonvolatile, in the form of RAM, ROM and flash memory 64 (e.g. EEPROM 64). All of which would be in circuit communication with logic processor 62.

A microprocessor 62' or a microcontroller 62' functions to execute coded instructions or sequences of coded instructions, e.g. a programmed algorithm. In exemplary embodiments, the microprocessor 62' or microcontroller 62' is programmed to receive inputs, perform one or more logical operations based on those inputs and accordingly direct outputs to a connected device. In the exemplary embodiments described above, the dispenser control 60 receives an input from the sensor 47 and selectively directs an output to enable operation of the motor 31.

Still referencing FIG. 4, a data storage device 68 is incorporated with the replaceable product reservoir 26. The term replaceable product reservoir 26 may be used interchangeably with refill unit 27. The data storage device 68 may be fixedly attached to a wall of the reservoir 26, a collar or other structural element of the refill unit 27. Alternatively, it may be integrated into one of the components of the refill unit 27. Any manner of incorporating the data storage device 68 may be used.

The data storage device 68 includes memory 69, which may be ROM (Read Only Memory), read-write memory, flash memory, or any other type of memory suitable to perform the functions described herein. In some exemplary embodiments, data stored on the read-write storage device 68 may be modified, erased or added to. In some embodiments, memory 69 may be memory, such as, for example, flash memory which does not require that a power source be continually connected to the memory in order to maintain viability of the data.

Figure 6:
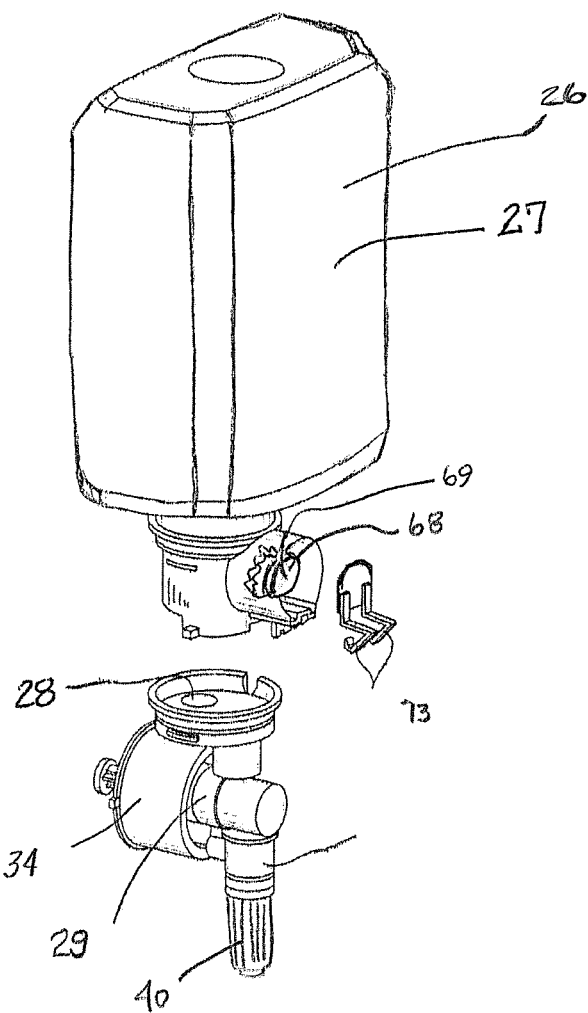
FIG. 6 depicts an exploded view of a data storage device incorporated into a refill unit, according to the embodiments of the subject invention.

Referencing FIGS. 5 and 6, the refill unit 27 includes circuitry communicating with the dispenser control 60. The communication between the refill unit 27 and the dispenser control 60 is bi-directional, where data is read from and written to the data storage device 68. In some embodiments, the refill unit 27 communicates with the dispenser control 60 by direct contact with electrical conductors 72. Other embodiments contemplated include wireless data communication devices, which utilize near-field communication techniques, such as Blue-tooth. Other forms of wireless communication may be employed including RF or Infra-Red communication. In this embodiment, the refill unit 27 and the dispenser control 60 will each include wireless transmitter-receiver components designated by numeral 74.

The data storage device 68 stores data related to the particular refill unit 27 that it is associated with. Data contained in the data storage device 68 may be retrieved by the dispenser control 60, as will be discussed further below. The term "status data" is used to describe one or more items of data that are indicative of the status or a characteristic of the product reservoir, container and or refill unit. Exemplary data that may be status data is data or information such as, for example, a refill identification number, a serial number, product type identifier (e.g. hand soap, hand sanitizer, lotion), batch number, manufacturing location, product expiration date, manufacture date, container volume, volume of product remaining in the container, volume of product removed from the container, number of dispenses remaining in the container, number of dispenses dispensed from the container, whether the refill unit was previously used, dispenser identification number that previously used the refill unit, fluid viscosity, battery charge status, and the like. In addition, the term status data may include additional data that is indicative of one or more specific distributors that are authorized to sell or supply the particular refill unit. The exemplary status data above may be for any of the product reservoir, container and/or refill unit, even though only one of these were specifically called out. Similarly, the descriptions herein use container, refill unit and product reservoir interchangeably when discussing the exemplary embodiments relating to status data and threshold data. Therefore identifying data or an operation with a "refill unit" is not limiting the exemplary embodiment to a refill unit having a container and a pump and in this context refill unit may be a product reservoir or container, unless noted otherwise.

The dispenser control 60 may read one or more pieces of status data from the data storage device 68, and use the data when performing one or more logical operations to determine if the refill is a correct refill, is an authentic or is an authorized refill (container or product reservoir). Based on the logical operations performed, the dispenser control 60 may selectively send an output signal 63 to control operation of the product dispenser 10, and more specifically to control commencing with a dispense event, or prevent a dispense event.

In some embodiments, the dispenser control 60 includes threshold data 78 stored in memory, which the logic processor 62 uses to compare against the status data 76. Examples of threshold data 78 may include: the current date, refill unit expiration time periods, a minimal volume level, a value indicative of the refill unit having previously been used, type of fluid authorized to be dispensed by the dispenser, size of the container, dose size, authorized refill codes, codes for determining whether the refill identification number is authorized for the particular dispenser, a required pattern, the number of allowed doses for the container size, viscosity of the fluid, and the like.

Data may ultimately be stored as bits of data consisting of binary ones and zeroes. Those skilled in the art will understand that binary data may be transformed into hexadecimal numbers, alpha-numeric characters or other formats of data as may be required for processing by the logic processor 62. The threshold data 78 may be stored in the dispenser control 60, in for example, dispenser memory 64. Threshold data 78 may be loaded into dispenser memory 64 at the time of manufacture, at the time of installation, at some other predetermined time, downloaded through an intermediate device during field service. Alternatively, threshold data 78 may be retrieved via a network connection to a remote computing device. The threshold data 78 may be downloaded at some predetermined time or in real time. In other instances, threshold data may be written into the coded instructions executed by the logic processor.

In some exemplary embodiments, the dispenser control 60 reads the status data 76 from the data storage device 68 in the refill unit 27 and compares it to the threshold data 78 stored in or retrieved by the dispenser control 60. The logic processor 62 performs logic operations on the data, i.e. the status data 76 and the threshold data 78, and in response selectively enables and/or disables a dispense event by sending or not sending an output signal to the motor 30, or other mechanism controlling actuation of the pump 29, 34.

The following example illustrates one exemplary embodiment. To activate the product dispenser 10, a user places his hand under the nozzle 40 of the product dispenser 10. The sensor 47, upon detection of the user's hand, sends a signal to the dispenser control 60 for the purpose of initiating a dispense event. The dispenser control 60 reads the status data 76 from the data storage device 68 associated with the refill unit 27 installed in the product dispenser 10. In an exemplary manner, the dispenser control 60 reads the expiration date and number of dispenses remaining (collectively referred to here as the status data 76) from the refill unit 27. The logic processor 62 compares the status data 76 to the threshold data 78. If the current date has not exceeded the expiration date and if the number of dispenses remaining is greater than a predetermined minimum counter value, then the logic processor 62 sends an output signal to the motor 31 to actuate the pump 29. If the logic processor 62 determines that the status data is outside the acceptable operating range of the threshold data 78, then the logic processor 62 disables the product dispenser by not sending an output signal to the motor 31.

In some embodiments, controller 60 causes the status data 76 to update the number of dispenses remaining in the refill unit 27. Accordingly, if the refill unit 27 is removed and put in a second dispenser, not shown, the second dispenser will be able to determine the number of doses remaining in the refill unit 27. In this way, a user is prevented from refilling the container 26 by breaching the integrity of the container 26 to add additional fluid in the container because once the predetermined number of doses have been dispensed, the dispenser will not dispense any more doses of fluid from the container 26.

Figure 7:
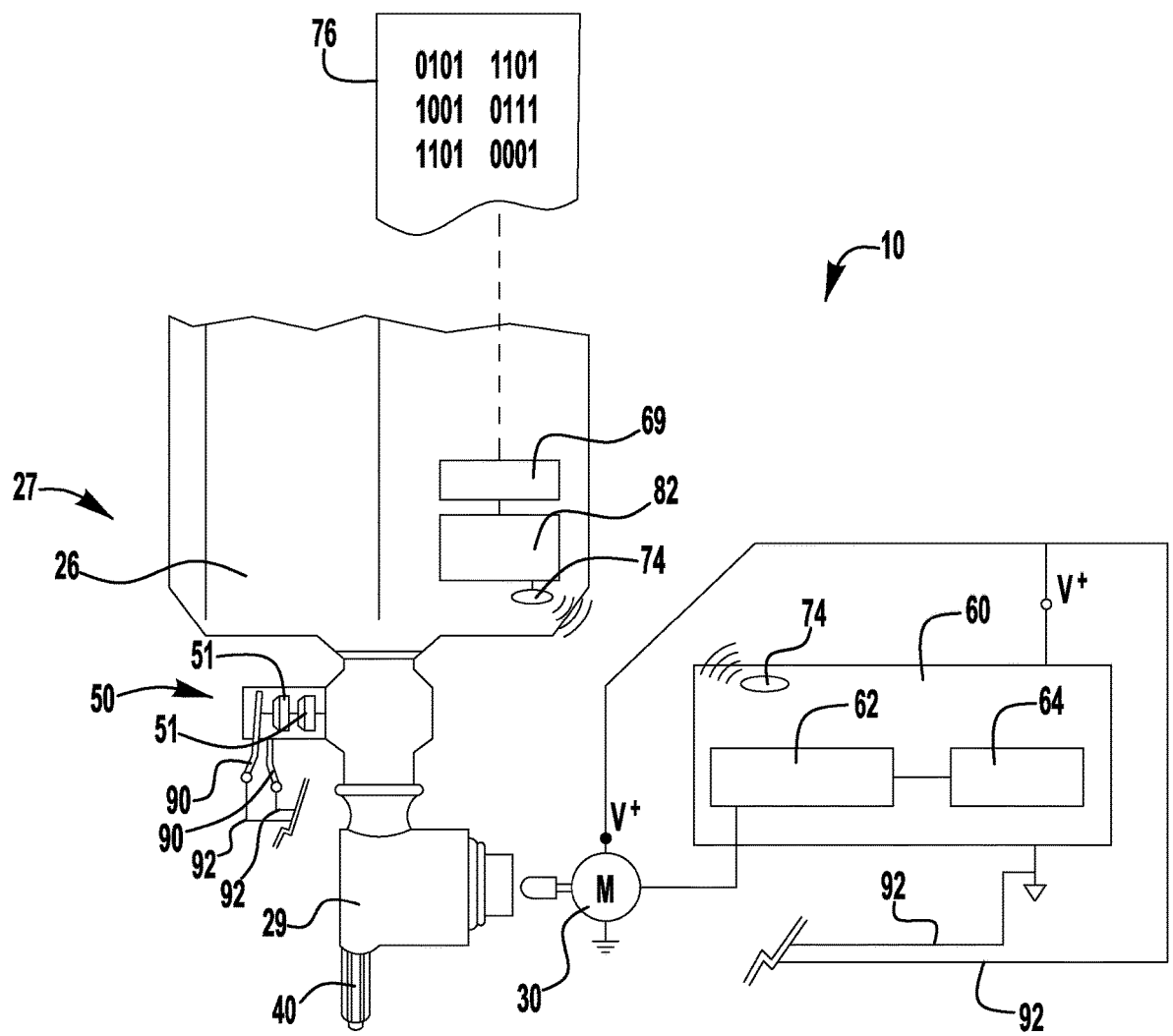
FIG. 7 depicts a schematic representation of a wireless communication device, a power source, a logic processor and memory incorporated into a refill unit, according to the embodiments of the subject invention.
Figure 8:
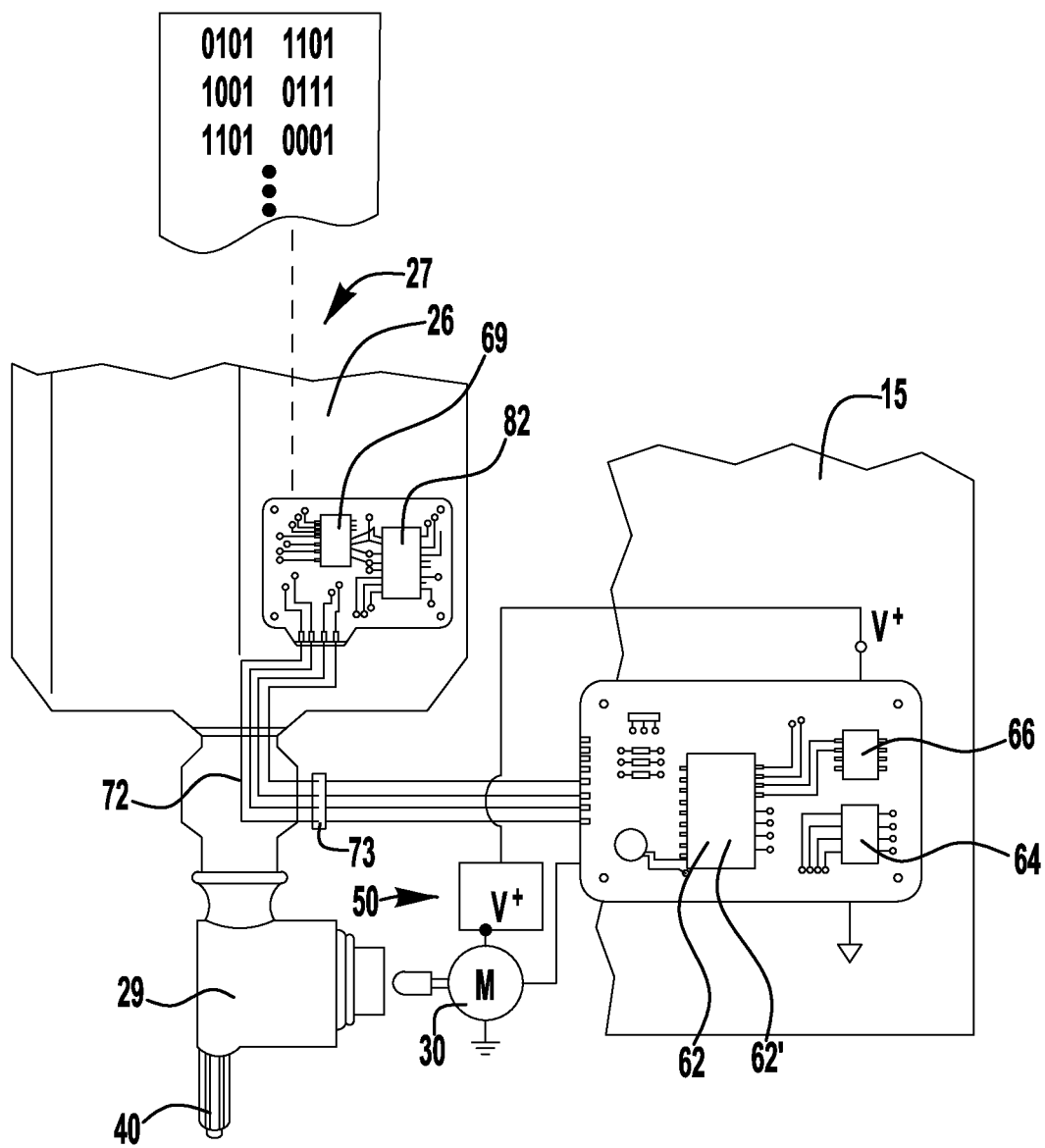
FIG. 8 depicts a logic processor and memory incorporated into a refill unit where the logic processor is schematically shown to be directly connected to a dispenser control, according to the embodiments of the subject invention.

With reference now to FIGS. 7 and 8, the refill unit 27 includes logic processor 82. The logic processor 82 may be a processor, a microprocessor or a microcontroller, or the like similar to those described above with respect to dispenser control 60. The data storage device 68 (or memory 69) may be connected to the logic processor 82 via a data bus, contacts, wireless connections, or the like. Status data 76 stored in the memory 69 may be communicated to the dispenser control 60 through logic processor 82. The logic processors 62, 82 may communicate data therebetween using known data communication protocols. Notably, the data may be communicated directly, i.e. by the direct connection of electrical conductors (shown schematically in FIG. 8), or wirelessly using the methods discussed above, e.g. Bluetooth (reference FIG. 7). When the product dispenser 10 is activated, the dispenser control 60 will request data from the logic processor 82, which will retrieve the data from memory and communicate the data to the logic processor 62. Accordingly, the logic processor 62 will selectively commence with a dispense event in a manner consistent with the above described embodiments. By selectively commence with, it is meant that the logic processor 62 may or may not send an output signal to the motor 31 to dispense product based on validating data stored in and retrieved from memory 69 resident with the refill unit 27. If logic processor 62 enables the product dispenser 10 to dispense product, instructions are sent to logic processor 82 on the refill unit 27 to modify (or add to) the data stored in memory 69. For example, the logic processor 82 may alter the status data 76 by decrementing a counter associated with the container volume. Skilled artisans will appreciate that when the refill unit 27 has been depleted of product, the status data 76 of the refill unit 27 may be updated to indicate that this particular refill unit 27 has expired and may not be reused.

Each of the logic processors 62, 82 may be programmed to encrypt the data transferred between the refill unit 27 and the dispenser control 60. The data encryption may be facilitated by executing coded instructions on each of the logic processors 62, 82 respectively. The code may be embedded in memory, i.e. firmware, or otherwise stored for access by the logic processors 62, 82.

In general, unencrypted data communicated between components in any system is susceptible to exploitation. This is especially true for wireless data communication. As it pertains to product dispensers, it may be possible to capture unencrypted data and/or learn how unencrypted data is communicated between the dispenser control and the refill unit for the purpose of writing fraudulent status data to the memory. The absconders of data may then be able to replaced valid status data with unauthorized and altered status data. Even if the data is encrypted before it is transmitted, it still may be possible to analyze certain encryption patterns over numerous dispensing cycles. To obviate these concerns, in some exemplary embodiments, the programmed algorithm executed on the logic processors 62, 82 may use rolling codes or hopping codes that change how the data is encrypted virtually every time the processors 62, 82 communicate and read or write data to memory 69.

Rolling code encryption uses a secret key, also referred to as a message authentication code or MAC, which is unique to the dispenser control 60 and authorized refill units 27. Numerous algorithms exist that utilize secret keys or MACs. In one embodiment, the AES algorithm (Advanced Encryption Standard algorithm) may be used to encrypt data transmitted between the dispenser control 60 and the refill unit 27. Any secret key size (typically measured in bits) that is supported by the AES algorithm may be chosen with sound judgment. In one embodiment, a 128-bit key is used to prevent the use of unauthorized refill units.

Symmetric encryption is also known as private key cryptography, and is called so because the private key used to encrypt and decrypt the message must remain secure. Anyone with access to the private key can decrypt the data. A sender, e.g. dispenser control 60, encodes a message into cipher text using a key, and the receiver, e.g. refill unit 27, uses the same key to decode it. The sender can use this encryption method as either a "stream" cipher or a "block" cipher, depending on the amount of data being encrypted or decrypted at a time. A stream cipher encrypts data one character at a time as it is sent or received, while a block cipher processes fixed chunks of data. Common symmetric encryption algorithms include Data Encryption Standard (DES), Advanced Encryption Standard (AES), and International Data Encryption Algorithm (IDEA).

Asymmetric encryption, or public-key cryptography, is different than the previous method because it uses two keys for encryption or decryption (it has the potential to be more secure). This type of cryptography uses two keys, a "private key" and a "public key" to perform encryption and decryption. The use of two keys differs from symmetric key cryptography because a single private-key does not need to be securely managed among multiple users.

In asymmetric cryptography, a public key may be freely available to others and may be used to encrypt messages before sending the data. A different, private key, remains with the receiver of cipher text messages, which uses it to decrypt the data. Algorithms that use public key encryption methods may include RSA and Diffie-Hellman. With these methods, a public key is freely available and is used to encrypt messages, while a different private key is used by the recipient to decrypt messages.

Hashing is another technique for encrypting data that may be used in the embodiments of the present invention. Hashing creates a unique, fixed-length signature for a message or data set. Each "hash" is unique to a specific message, so minor changes to that message would be easy to track. Once data is encrypted using hashing, it cannot be reversed or deciphered. Hashing, though, not technically an encryption method as such, is still useful for proving data hasn't been tampered with.

Any of the aforementioned encryption methods may be used with the embodiments described herein. However, other forms encryption and decryption may also be implemented without departing from the intended scope of coverage of the claimed subject matter.

With continued reference to FIG. 7, another exemplary embodiment incorporates batteries 51 into the refill unit 27. The batteries 51 may comprise low power-density batteries, which may include coin cell batteries (also known as button cell batteries). As is known in the art, a coin cell is known for its small size and light weight. However, while a coin cell may be chosen because of its footprint, other types of batteries may be incorporated into the refill unit 27 without departing from the intended scope of coverage of the embodiments of the subject invention. For example, AAA cell alkaline batteries may be integrated into refill unit 27. It will be readily seen that a fresh supply of energy from the onboard batteries is provided every time the refill unit 27 is replaced.

The housing or collar of the refill unit 27 may be fashioned having one or more recesses configured to receive or enclose the batteries 51. A conductor plate 90 may electrically connect to the respective terminal ends of the batteries 51 and to conductors 92, which extend to direct the flow of electrical current from the batteries 51 to the dispenser control 60, the motor 30 or other electrically powered component of the product dispenser 10. It should be realized that the batteries 51 may also supply power to the refill unit 27, i.e. the logic processor 82 and/or data storage device 68.

Figure 9:
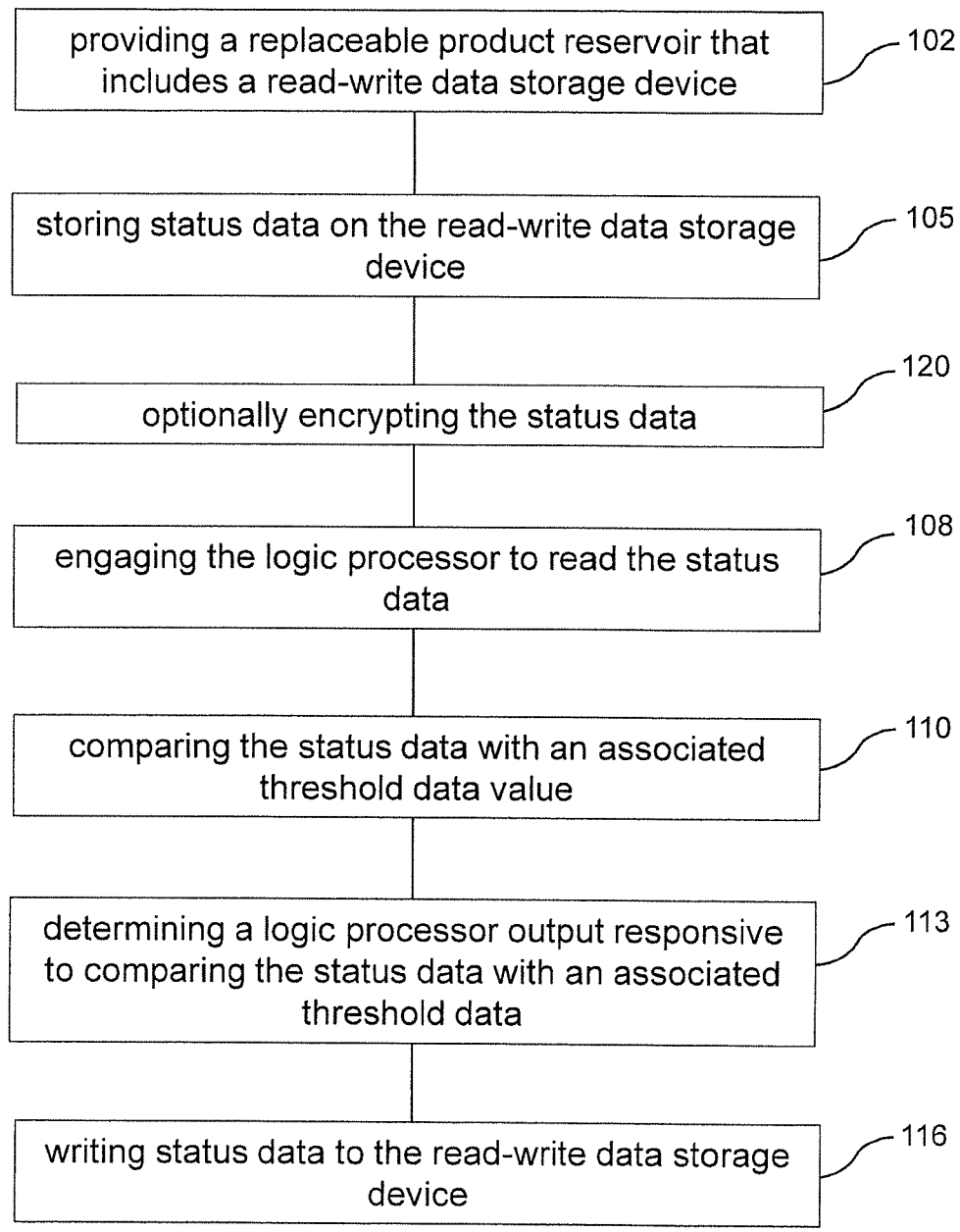
FIG. 9 depicts a diagram showing a method of authenticating a replaceable product reservoir for use in a product dispenser, according to the embodiments of the subject invention.

With reference to all of the figures, an exemplary methodology of authenticating a replaceable product reservoir 26 is diagrammed in FIG. 9. The methodology pertains to a product dispenser 10 having a physical construction consistent with the description provided above. More specifically, the method relates to a product dispenser 10 that validates data stored on a replaceable product reservoir 26. If the replaceable product reservoir 26 is authentic (i.e. approved by the dispenser manufacturer), the product dispenser 10 will be enabled for use. Otherwise, the product dispenser 10 is disabled. Similar methodologies may be used to enable or disable the dispenser as a function of one or more of the status data and threshold data identified above.

At block 102 in the methodology includes providing a replaceable product reservoir 26 having a data storage device 68 associated with the product reservoir 26.

At block 105 in the methodology includes storing data on the data storage device 68. In one particular embodiment, the data storage device 68 stores data for read access by a logic processor 62. It is also contemplated to write data to the data storage device 68. Stated differently, block 105 may comprise storing data and writing data to the data storage device 68, i.e. a read-write data storage device 68.

At block 108 the logic processor 62 reads the status data from the data storage device 68. In some embodiments, logic processor 62 reads the data when a dispense event is initiated by placing a hand in proximity to a sensor. Alternatively, the logic processor 62 may automatically read the data every time the replaceable product reservoir 26 is installed into the product dispenser 10. Some embodiments include a replaceable product reservoir 26 that has its own logic processor 82, where the logic processor 82 is directly connected to the data storage device 68. In this particular embodiment, engaging logic processor 62 to read status data requires sending a request for information to logic processor 82, which in turn retrieves data from the data storage device 68 and then sends it back to the logic processor 62.

At block 120 in the status data is encrypted before it is communicated between the logic processors 62, 82. The logic processors 62, 82 execute coded instructions that encrypt the data. The coded instructions may employ rolling codes to randomize the data so that would-be hackers cannot abscond with the data and thereby create an unauthorized duplicate product reservoir or bypass the authenticating features of this invention.

Once data has been received by the dispenser control 60, the logic processor 62 compares the status data with threshold data (at block 110) to check that the status of the product reservoir 26 has not fallen outside a range of acceptable operating parameters. The logic processor 62 then generates an output based on the comparison in block 113.

If a dispense event has occurred that changes the status of the replaceable product reservoir 26, the data is updated data on the data storage device 68 at block 116. The data written to the storage device 68 may relate to the amount of product remaining in the container or may indicate that the replaceable product reservoir 26 is empty and should not be used again.

The exemplary blocks may be performed in other orders. In addition, one or more blocks may be eliminated. Further, additional blocks may be carried out between two or more blocks.

In some exemplary embodiments, when a refill unit 27 having a data storage device 68 is inserted into the dispenser 10, controller 60 reads status data indicative of the amount of fluid left in refill unit 27. Upon dispensing one or more dispenses, controller 60 causes status data indicative of the amount of fluid left in refill unit 27 to be written to the storage device 68. In this exemplary embodiment, attempting to refill the refill unit 27 with additional product is prevented because once the predetermined volume of fluid has been dispensed from the refill unit 27, controller 60 will prevent dispenser 10 from dispensing any more fluid from the refill unit 27. Because the status data indicative of the amount of fluid left in refill unit 27 is updated in the storage device 68, which is attached to the refill unit 27, even if a refilled refill unit 27 is placed in a new dispenser 10, the controller 60 in the new dispenser 10 would be able to determine that the refill unit 27 was refilled and prevent any fluid from being dispensed from the refilled refill unit.

Having illustrated and described the principles of the dispensing system in one or more embodiments, it should be readily apparent to those skilled in the art that the invention can be modified in arrangement and detail without departing from such principles.

What is claimed:

1. A product dispensing system, comprising:
   a refill unit containing a dispensable fluid product, the refill unit having an outlet;
   a dispenser housing for retaining the refill unit, wherein the refill unit is removable from the dispenser housing;
   a pump for pumping fluid out of the refill unit;
   a pump actuator for causing the pump to pump the fluid;
   a read-write data storage device secured to the refill unit, the read-write data storage device storing status data; and,
   a dispenser control having a first logic processor and dispenser memory;
   wherein the first logic processor receives at least one piece of status data indicative of the amount of fluid in the refill unit and at least one piece of data indicative of the identity of the refill unit from the data storage device;
   wherein the dispenser controller determines if the identity of the refill unit is within a threshold data and dispenses fluid if the identity of the refill unit is in the threshold data; and
   wherein the dispenser controller writes status data to the read-write storage device that includes the volume of fluid removed from the refill unit;
   wherein the refill unit comprises an on-board power source that is removed from the dispenser with the refill unit and inserted into the dispenser with the refill unit.

2. The product dispensing system of claim 1, wherein the status data is encrypted.

3. The product dispensing system of claim 1, wherein the on-board power source is one or more batteries.

4. The product dispensing system of claim 1, wherein the refill unit comprises a container and a collar secured to the container, and wherein the on-board power source is located on the collar.

5. The product dispensing system of claim 1, wherein the pump is connected to the refill unit and is removed and replaced with the refill unit.

6. The product dispensing system of claim 1 further comprising two or more contacts for transferring power from the on-board power source to the dispenser.

7. The product dispensing system of claim 1 wherein the read-write data storage device comprises data indicative of the refill expiration date.

8. The product dispensing system of claim 1 wherein the read-write data storage device comprises data indicative of an authorization code.

9. A product dispensing system, comprising:
   a refill unit containing a dispensable fluid product;
   a dispenser housing for retaining the refill unit;
   a pump for pumping fluid out of the refill unit;
   a read-write data storage device secured to the refill unit, the read-write data storage device storing encrypted status data; and,
   a dispenser control having a dispenser processor and dispenser memory;
   wherein the dispenser processor wirelessly receives at least one piece of status data indicative of the amount of fluid in the refill unit and at least one piece of data indicative of the identity of the refill unit from the data storage device; and
   wherein the dispenser processor wirelessly writes at least one piece of status data to the read-write data storage device that includes the volume of fluid remaining in the refill unit;
   wherein the refill unit comprises an on-board power source that is removed from the dispenser with the refill unit and inserted into the dispenser with the refill unit.

10. The product dispensing system of claim 9, wherein the dispenser processor wirelessly receives at least one piece of status data from the read-write data storage device that is indicative of the expiration date of the refill unit; and wherein the dispenser processor allows dispensing of the fluid product if the expiration date of the refill unit has not passed and prevents dispensing of the fluid product if the expiration date has passed.

11. The product dispensing system of claim 9, wherein the on-board power source is one or more batteries.

12. The product dispensing system of claim 9, wherein the refill unit comprises a container and a collar secured to the container, and wherein the on-board power source is located on the collar.

13. The product dispensing system of claim 9, wherein the pump is connected to the refill unit and is removed and replaced with the refill unit.

14. The product dispensing system of claim 9 further comprising two or more contacts for transferring power from the on-board power source to the dispenser.

15. A product dispensing system comprising:
    a dispenser housing;
    a removable and replaceable container containing a dispensable fluid product;
    a holder for retaining the removable replaceable container;
    a pump for pumping fluid out of the container;
    a read-write data storage device secured to the container, the read-write data storage device storing status data; and,
    a dispenser control having a dispenser processor and dispenser memory;
    wherein the dispenser processor is configured to wirelessly receive at least one piece of status data indicative of the amount of fluid in the container;
    wherein the dispenser processor is configured to wirelessly receive at least one piece of data indicative of the identity of the container from the data storage device;
    wherein the dispenser processor is configured to wirelessly receive at least one piece of data indicative of the authenticity of the container from the data storage device; and
    wherein the dispenser processor wirelessly writes at least one piece of status data to the read-write data storage device that includes the volume of fluid remaining in the container;
    wherein the refill unit comprises an on-board power source that is removed from the dispenser with the refill unit and inserted into the dispenser with the refill unit.

16. The product dispensing system of claim 15, wherein the status data is encrypted.

17. The product dispensing system of claim 15, wherein the on-board power source is one or more batteries.

* * * * *